United States Patent [19]

Ferrari

[11] Patent Number: 4,687,621

[45] Date of Patent: Aug. 18, 1987

[54] NUCLEAR FUEL ASSEMBLY WITH IMPROVED SPECTRAL SHIFT-PRODUCING RODS

[75] Inventor: Harry M. Ferrari, Pittsburgh, Pa.

[73] Assignee: Westinghouse Electric Corp., Pittsburgh, Pa.

[21] Appl. No.: 638,333

[22] Filed: Aug. 6, 1984

[51] Int. Cl.⁴ .......................... G21C 7/04; G21C 7/26
[52] U.S. Cl. .................... 376/209; 376/327; 376/336; 376/339; 376/447
[58] Field of Search .............. 376/327, 336, 339, 447, 376/337, 209

[56] References Cited

U.S. PATENT DOCUMENTS

| | | | |
|---|---|---|---|
| 3,382,153 | 5/1968 | Bigge et al. | 376/447 |
| 4,371,495 | 2/1983 | Marlatt . | |
| 4,432,934 | 2/1984 | Gjertsen et al. . | |
| 4,460,540 | 7/1984 | Funk et al. | 376/327 |

FOREIGN PATENT DOCUMENTS

| | | | |
|---|---|---|---|
| 0054237 | 6/1982 | European Pat. Off. . | |
| 2461356 | 7/1975 | Fed. Rep. of Germany | 376/339 |
| 2633352 | 1/1978 | Fed. Rep. of Germany | 376/327 |
| 1197868 | 12/1959 | France . | |
| 1541063 | 10/1968 | France . | |
| 2498800 | 7/1982 | France . | |
| 1112346 | 6/1968 | United Kingdom . | |
| 1195670 | 6/1970 | United Kingdom | 376/336 |
| 1225947 | 3/1971 | United Kingdom | 376/327 |
| 1233832 | 6/1971 | United Kingdom . | |
| 1358984 | 7/1974 | United Kingdom . | |
| 1511494 | 5/1978 | United Kingdom . | |

Primary Examiner—Harvey E. Behrend
Attorney, Agent, or Firm—W. A. Elchik

[57] ABSTRACT

An improved spectral shift-producing rod in a fuel assembly of a nuclear reactor has an elongated hollow tubular body with a pair of end plugs attached to its opposite ends to hermetically seal the rod. A burnable poison material is contained in the hollow body. The material generates a gas within the body as operation of the reactor proceeds. Also, the material is soluble in moderator water when brought into contact with the same. The rod has a weakened structural region which is subject to rupture at a given level of internal pressure. Preferably, the weakened region takes the form of a thinned disc-like portion formed in at least one of the end plugs. The water soluble material within the rod depresses power initially by absorbing neutrons. Absorption of neutrons causes generation of helium gas which increases internal pressure within the rod. When the internal pressure exceeds the rupture strength of the weakened region of the rod, the hermetic seal is broken and water enters the rod. The absorber material is gradually dissolved so that eventually the rod fills with water. This results in increase moderation which provides extra reactivity within the fuel assembly.

6 Claims, 4 Drawing Figures

NUCLEAR FUEL ASSEMBLY WITH IMPROVED SPECTRAL SHIFT-PRODUCING RODS

CROSS REFERENCE TO RELATED APPLICATION

Reference is hereby made to the following co-pending United States patent application dealing with subject matter related to the present invention: "Moderator Control Apparatus For A Nuclear Reactor Fuel Assembly" by D. B. Lancaster et al, U.S. Ser. No. 623,744, filed June 22, 1984.

BACKGROUND OF THE INVENTION

1. Field of the Invention

The present invention relates generally to nuclear reactors and, more particularly, is concerned with a nuclear fuel assembly therein employing at least one rod which contains water soluble neutron absorber material and has a weaken region rupturable at a given internal pressure for allowing entry of water and dissolution of the material so as to thereby produce a spectral shift which increases reactivity.

2. Description of the Prior Art

In the conventional designs of pressurized water reactors (PWR), an excessive amount of reactivity is designed into the reactor core at start-up so that as the reactivity is depleted over the life of the core there will still be sufficient reactivity to sustain core operation over a long period of time. However, since an excessive amount of reactivity is designed into the reactor core at the beginning of the core life, steps must be taken at that time to properly control it.

One technique to control reactivity is to produce an initial spectral shift which has the effect of increasing the epithermal (low reactivity) part of the neutron spectrum at the expense of the thermal (high reactivity) part. This results in production of fewer thermal neutrons and decreased fission. Then, as fission decreases during extended reactor operation, a reverse shift back to the thermal part of the neutron spectrum at the expense of the epithermal part is undertaken. Such control technique is primarily accomplished through the use of displacer rods. As the name implies, these rods are placed in the core to initially displace some of the moderator water therein and decrease the reactivity. Then, at some point during the core cycle as reactivity is consumed, the displacement associated with these rods is removed from the core so that the amount of moderation and therewith level of reactivity in the core are increased.

One approach considered for removing this displacement is through the use of movable mechanisms, similar to those associated with control rods. Such an approach is described in U.S. patent application entitled "An Improved Water Displacer Rod Spider Assembly For A Nuclear Reactor Fuel Assembly" by Trevor A. Francis, filed Mar. 30, 1984 and assigned U.S. Ser. No. 595,154.

Another approach contemplated for removing the displacement is to have membranes provided on the ends of the displacer rods which are penetrated at some point in time to allow the rods to be filled with water. A small heating element surrounding a specially indented end cap on the hollow displacer rod is turned on at an appropriate time. The heat weakens the indented part of the end cap to the point where the external water pressure opens the end cap and fills the rod with water.

A further approach used to remove the displacement is the provision of at least one rod in the fuel assembly filled initially with helium or other suitable gas. Then, as reactor operation proceeds, the gas-filled rod expands and increases in length until it engages a spike mounted on the adjacent portion of the top nozzle. The spike pierces the upper end plug of the rod and permits the rod to fill with water. Such approach is described in U.S. Pat. No. 4,371,495 to Marlatt.

Still another approach to displacement removal is to withdraw water displacer rods at the desired time by using a drive mechanism. This approach is described in U.S. Pat. No. 4,432,934 to Gjersten et al.

While all of the above-cited prior approaches operate reasonably well and generally achieve their objectives under the range of operating conditions for which they were designed, a need still exists for an alternate approach to the problem of moderator displacement which is simpler, less costly and can be tailored to take effect at the desired time during the core cycle.

SUMMARY OF THE INVENTION

The present invention provides an improved spectral shift-producing rod designed to satisfy the aforementioned needs. Unlike the prior art approaches which require assistance external to the rod, such as external heat, pressure or mechanical force, to effectuate removal of moderator displacement, the present invention utilizes an interactive mechanism composed of one component contained internally within the rod and another component forming a part of the rod. The component within the rod is a burnable poison material, such as a boron substance in a form which is water soluble, which generates helium gas; the component forming a part of the rod is a region thereof specifically fabricated to fail when the helium gas within the rod reaches a given high internal pressure. Preferably, the region is a thinned or weakened, rupturable disc-like portion of one of the end plugs of the rod.

By relying on the above-described interactive mechanism to effect removal of moderator displacement, the improved spectral shift-producing rod of the present invention can be tailored as desired to fit the particular conditions prevailing in the fuel assembly. For instance, by varying the initial internal pressure within different groups of the rods in the fuel assemblies, it would be possible to have the different groups of rods rupture at different times in the core cycle. In such manner, removal of water displacement can be phased-in in increments. The same result, gradual incremental removal of displacement, can also be achieved by varying the plenum volume of different groups of the rods. In summary, by properly varying these two parameters—initial internal pressure and plenum volume—of the rods, it is possible to add moderator water which increases reactivity as desired during the core operating cycle.

Accordingly, the present invention sets forth in a fuel assembly for a nuclear reactor including an organized array of nuclear fuel rods and moderator/coolant liquid flowing along the fuel rods, at least one improved spectral shift-producing rod disposed among the fuel rods of the assembly. The improved rod includes: (a) an elongated hollow hermetically-sealed tubular member; (b) a weakened region formed in a portion of the tubular member which is subject to rupture at a given level of high internal pressure; and (c) a burnable poison material contained in the tubular member which generates gas in the tubular member as operation of the reactor proceed and is soluble in the moderator/coolant liquid when brought in contact with the same. More particularly, the tubular member is formed by a tubular body and a pair of end plugs attached to opposite ends of the body so as to hermetically seal the same. The weakened region in the member preferably takes the form of a thinned disc-like portion formed in at least one of the end plugs.

Ordinally, a plurality of the improved spectral shift-producing rods is utilized in the fuel assemblies of the reactor. Each improved rod initially acts as a fixed burnable neutron absorber having the desired nuclear characteristic for proper moderator temperature coefficient and power distribution control. The water soluble boron material within the rod depresses power initially by absorbing neutrons. As generally known per se, when boron absorbs neutrons it transmutes to lithium and helium gas. The helium gas generated increases the internal pressure within the absorber rod. When the internal pressure exceeds the rupture strength of the weakened region of the rod, the hermetic seal is broken. This allows moderator water to enter the rod, contact the boron material therein and gradually dissolve the same so that eventually the rod is filled with reactor coolant/moderator water. The net result is that when the rod ruptures a spectral shift occurs because the amount of moderator water within the particular fuel assembly is increased. The increased moderation provides extra reactivity within the fuel assembly which enhances the life and energy output of the fuel assembly.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
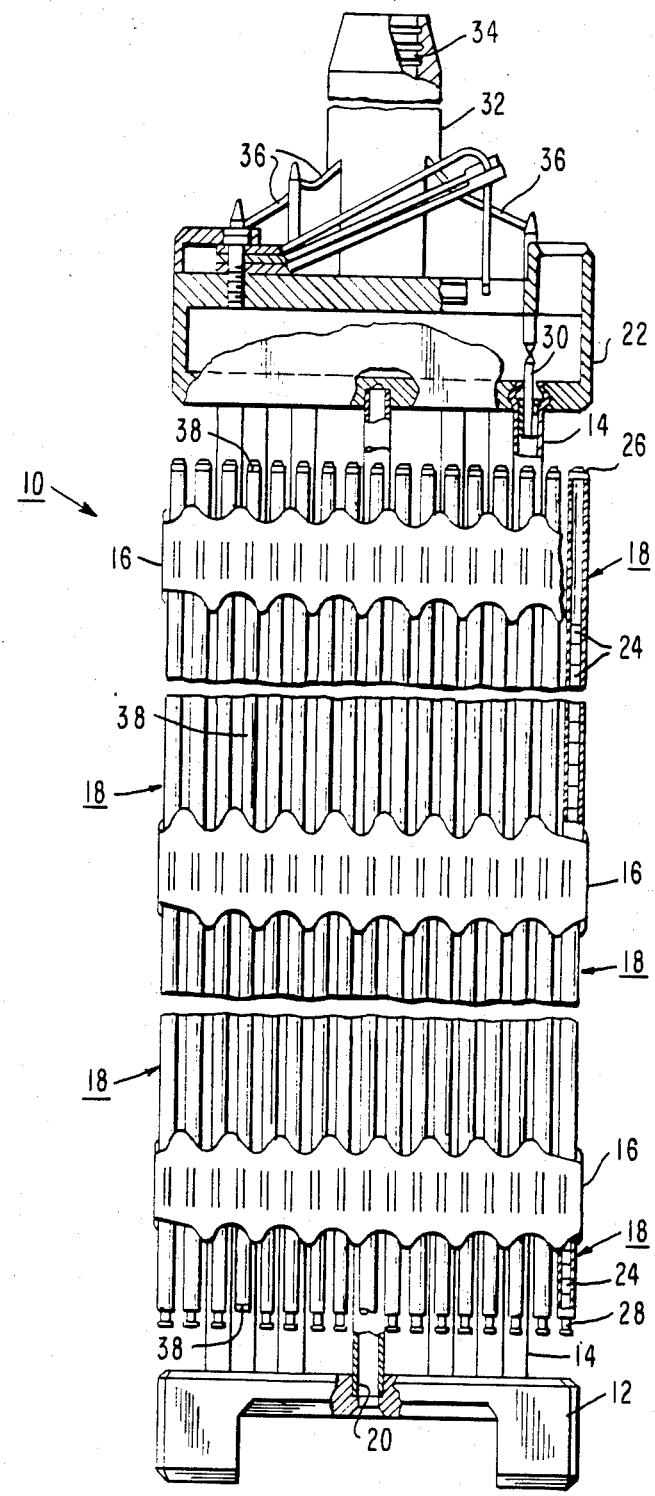
FIG. 1 is an elevational view, partly in section, of a fuel assembly which incorporates at least one of the improved spectral shift-producing rods of the present invention, the assembly being illustrated in vertically foreshortened form with parts broken away for clarity.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28. The fuel pellets 24 composed of fissile material are responsible for creating the reactive power of the PWR. A liquid moderator/coolant such as water, or water containing boron, is pumped upwardly through the fuel assemblies of the core in order to extract heat generated therein for the production of useful work.

To control the fission process, a number of control rods 30 are reciprocally movable in the guide thimbles 14 located at predetermined positions in the fuel assembly 10. Specifically, the top nozzle 22 includes a rod cluster control mechanism 32 having an internally threaded cylindrical member 34 with a plurality of radially extending flukes or arms 36. Each arm 36 is interconnected to a control rod 30 such that the control mechanism 32 is operable to move the control rods 30 vertically in the guide thimbles 14 to thereby control the fission process in the fuel assembly 10, all in a well-known manner.

IMPROVED SPECTRAL SHIFT-PRODUCING RODS

In the operation of a PWR it is desirable to prolong the life of the reactor core as long as feasible to better utilize the uranium fuel and thereby reduce fuel costs. To attain this objective, it is common practice to provide an excess of reactivity initially in the reactor core and, at the same time, provide means to reduce excess reactivity at the early stage of the core operating cycle and then to increase reactivity later on.

Figure 2:
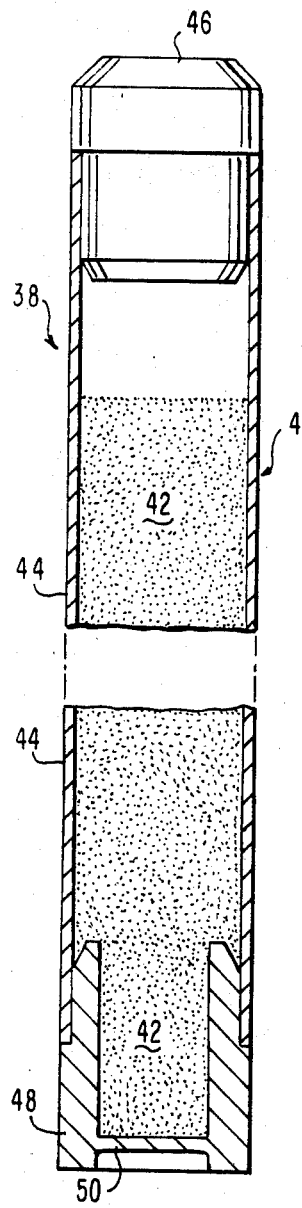
FIG. 2 is an enlarged, vertically foreshortened, sectional view of the improved rod being illustrated with the moderator soluble, burnable poison present therein prior to rupture of the weakened portion of the rod.

The present invention relates to a spectral shift-producing rod 38 which controls reactivity in an improved manner. While only one rod 38 is illustrated in FIG. 1, it should be understood that preferably a number of such rods would be employed in the fuel assembly 10. As best seen in FIG. 2, the improved rod 38 includes an elongated hollow hermetically-sealed tubular member 40 having a burnable poison material 42 contained therein which generates gas as operation of the PWR proceeds. The poison material 42 is preferably a boron substance, e.g., $B_2O_3$, $H_3BO_3$ (boric acid), $Li_2B_4O_7$, $LiBO_2$, or $K_2B_4O_7$, in a form which becomes soluble in the moderator/coolant liquid when the hermetic seal is broken and the substance is brought in contact with it. The boron substance can be in solid or liquid form such as boric acid solution. Also, the boron could be in a loose powder form, compacted form, or high density compacted and sintered form.

The hollow tubular member 40 is formed by a tubular body 44 and a pair of upper and lower end plugs 46,48, all of which can be composed of any suitable material such as zirconium-based alloy. The tubular member 40 includes a weakened region formed in a portion thereof which is subject to rupture at a given level of normally-expected high internal pressure, such as will be eventually produced as gas is generated in the member by the poison material. Thus, it is clear that the given level of internal pressure at which the weakened region is subject to fracture is designed to be less than the maximum level of internal pressure normally expected to be generated within the member 40 by the poison material 42 by normal operation of the reactor. While the weakened region can be located at various places on the member, it preferably takes the form of a thinned disc-like portion 50 formed centrally in the lower end plug 48.

Figure 3:
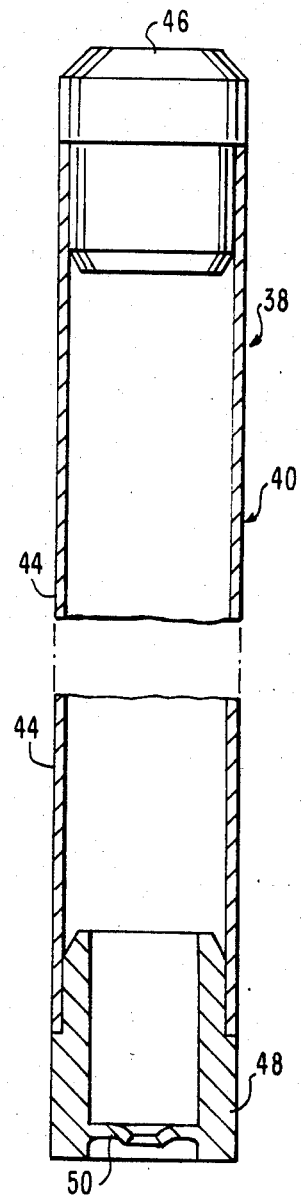
FIG. 3 is a view similar to that of FIG. 2, but illustrating the rod after rupture of the weakened portion and filling of the rod and dissolution of the remaining poison material by moderator water.

Thus, the improved rod 38 initially acts as a fixed burnable neutron absorber for controlling initial excess reactivity. The water soluble boron material 42, within the hollow tubular body 44 of the rod 38, depresses power initially by absorbing neutrons. But as the boron absorbs neutrons it transmutes to lithium and helium gas. The helium gas so generated increases the internal pressure (for example, from an level of less than 1200 psi at room temperature) within the absorber rod. When the internal pressure exceeds the rupture strength of the thinned disc-like portion 50, it ruptures and the hermetic seal is broken, as seen in FIG. 3. This allows moderator/coolant water to enter the rod 38, contact the boron material 42 therein and gradually dissolve it so that eventually the rod is filled with moderator water. Thus, the rupture of the rod causes a spectral shift to occur because the amount of moderator water within the particular fuel assembly 10 has now increased. Increased moderation provides extra reactivity within the fuel assembly which enhances the life and energy output of the fuel assembly.

Figure 4:
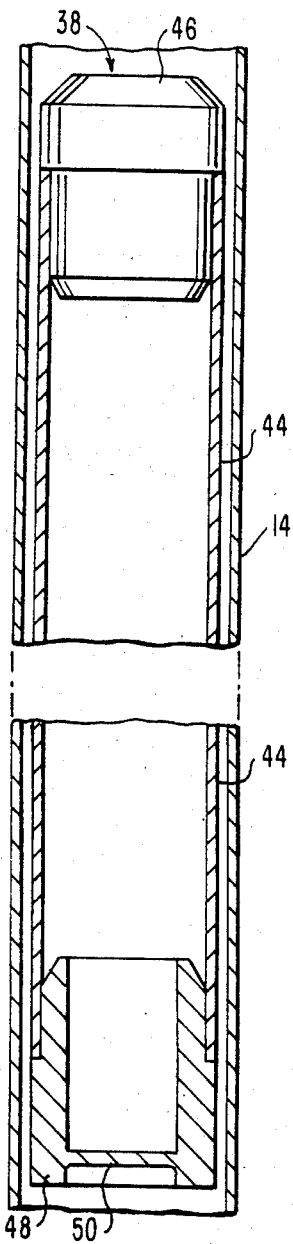
FIG. 4 is another view similar to that of FIG. 2, but showing, as an alternative, the improved rod disposed in one of the control rod guide thimbles of the fuel assembly which is illustrated in fragmentary form.

FIG. 4 merely illustrates the disposition of the improved rod 38 in one of the guide thimbles 14 in place of a control rod. It could be connected to one of the arms 36 of the control mechanism 32.

It will be readily appreciated that the improved spectral shift-producing rod 38 can be tailored as desired to match the particular conditions prevailing in the fuel assembly. For instance, the rod can be designed to rupture at the desired time during the core operating cycle by varying the plenum volume of the rod and/or by varying the initial internal pressure within different ones of the rods. By properly varying these two parameters, it is possible to add moderator water which increases reactivity as desired during the cycle. For example, it would be possible to have 25% of the spectral shift-producing rods rupture 40% through the cycle, 35% of the rods rupture approximately 60% through the cycle and the remaining 40% of the rods rupture at about 80% through the cycle. Although there would be some uncertainty as to the process time when rupture would occur, the precise time is not too critical since there would be statistical variation so that relatively small reactivity changes can easily be accommodated by control rod movements or changes in coolant boron concentration or flow.

It is thought that the improved spectral shift rod of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a nuclear reactor having fuel assemblies and a moderator-coolant liquid flowing through said fuel assemblies, each fuel assembly including an organized array of nuclear fuel rods wherein said moderator-coolant liquid flows along said fuel rods, at least one improved spectral shift-producing rod disposed among said fuel rods, said spectral shift-producing rod comprising:

(a) an elongated hollow hermetically-sealed tubular member;

(b) a weakened region formed in a portion of said member, said portion being subject to rupture at a given level of internal pressure; and (c) burnable poison material contained in said member which generates gas in said member as operation of the reactor proceeds normally, said material being soluble in said moderator-coolant liquid when brought into contact therewith;

(d) said given level of internal pressure being less than the maximum level of internal pressure normally expected to be generated within said member by said poison material by normal operation of said reactor.

2. The spectral shift-producing rod as recited in claim 1, wherein said weakened region of said tubular member takes the form of a thinned portion formed in an end of said member.

3. The spectral shift-producing rod as recited in claim 1, wherein said tubular member is formed by an elongated tubular body having opposite ends and a pair of end plugs attached to said opposite ends of said body so as to hermetically seal said body.

4. The spectral shift-producing rod as recited in claim 3, wherein said weakened region of said tubular member takes the form of a thinned disc-like portion formed in at least one of said end plugs.

5. The spectral shift-producing rod as recited in claim 1, wherein said tubular member is hermetically sealed containing a desired predetermined elevated initial internal pressure so as to tailor said rod such that its weakened portion will rupture at a generally known time during normal operation of said reactor.

6. In a nuclear reactor having fuel assemblies and a moderator-coolant liquid flowing through said fuel assemblies, each fuel assembly including an organized array of nuclear fuel rods wherein said moderator-coolant liquid flows along said fuel rods, at least one improved spectral shift-producing rod disposed among said fuel rods, said spectral shift-producing rod comprising:

(a) an elongated hollow hermetically-sealed tubular member formed by an elongated tubular body having opposite ends, and a pair of end plugs attached to said opposite ends of said body so as to hermetically seal said body;

(b) a weakened region formed in a portion of said member, said portion being subject to rupture at a given level of internal pressure, said weakened region being in the form of a thinned disc-like portion form in at least one of said end plugs; and (c) burnable poison material contained in said member which generates gas in said member as operation of the reactor proceeds normally, said material being soluble in said moderator-coolant liquid when brought into contact therewith;

(d) said given level of internal pressure being less than the maximum level of internal pressure normally expected to be generated within said member by said poison material by normal operation of said reactor;

(e) said tubular member being hermetically sealed containing a desired predetermined elevated initial internal pressure so as to tailor said rod such that its weakened portion will rupture at a generally known time during normal operation of said reactor.

* * * * *